United States Patent [19]

Mirick et al.

[11] Patent Number: 5,264,655
[45] Date of Patent: Nov. 23, 1993

[54] METHOD AND PRODUCTS FOR TREATING ASBESTOS

[75] Inventors: William Mirick, Worthington, Ohio; Walter B. Forrister, Midland, Mich.

[73] Assignee: Austen-Chase Industries Inc., New York, N.Y.

[21] Appl. No.: 958,054

[22] Filed: Oct. 5, 1992

Related U.S. Application Data

[63] Continuation-in-part of Ser. No. 509,571, Apr. 13, 1990, and a continuation-in-part of Ser. No. 862,433, Apr. 2, 1992.

[51] Int. Cl.$^5$ .................. A62D 3/00; A61L 11/00; B09B 3/00
[52] U.S. Cl. .................. 588/242; 588/254; 588/901; 423/167.1; 423/341; 252/79.3
[58] Field of Search .................. 423/155, 167, 331, 335, 423/336, 659, DIG. 20, 167.1; 588/242, 254, 901; 252/79.3

[56] References Cited

U.S. PATENT DOCUMENTS

| | | | |
|---|---|---|---|
| 112,650 | 3/1871 | Stevens | 423/167 |
| 1,094,505 | 4/1914 | Whitney | 423/167 |
| 3,297,516 | 1/1967 | Naumann et al. | 423/167 |
| 3,965,284 | 6/1976 | Xantos et al. | 423/221 |
| 4,347,150 | 8/1982 | Arpin | 252/174.23 |
| 4,474,742 | 10/1972 | Graceffa et al. | 423/331 |
| 4,693,755 | 9/1987 | Erzinger | 106/160 |
| 4,812,204 | 3/1989 | Deluaux et al. | 432/167 |

FOREIGN PATENT DOCUMENTS

| | | |
|---|---|---|
| 0372084 | 6/1990 | European Pat. Off. |
| 181504 | 2/1907 | Fed. Rep. of Germany |
| 64-10338 | 11/1989 | Japan |
| 356191 | 10/1931 | United Kingdom |
| 2015979 | 8/1979 | United Kingdom |

OTHER PUBLICATIONS

Anenuromentally Acceptable Treatment Method for Chrysotile Asbestos G. Baldwin Chemical Abstracts UNSTES. vol. 109 Nov. 20 Nov. 14 1988 p. 335.
The destruction of Chrysotile Asbestos Using Waste Acids L. Heasman et al Chemical Abstracts vol. 105, No. 6 Aug. 9 1986.
Asbestos vol. 1, Michaels and Chissick 1979 pp. 82–68.
ECON The Enviromental Magazine Feb. 1991 p. 39 and pages containing ABCOV Process Advertisement.
Uilmans Enclopedia of Industrial Chemistry 5th VCii edition Verlag GEellshaft mBH Wein May 1985 pp. 151–167.

*Primary Examiner*—Gary P. Straub
*Attorney, Agent, or Firm*—Weil, Gotshal & Manges

[57] ABSTRACT

A method for rendering asbestos in an asbestos-containing material harmless comprises wetting the material with an aqueous solution containing about 1 to 25% by weight of an organic acid, such as trifluoroacetic acid and at least 1% by weight of a source of fluoride ions, such as ammonium fluoride The acid hydrolyses the magnesium oxide units in asbestos while the fluoride ions attack the interleaved silica layers in the crystal structure of asbestos, thereby destroying the fibrous nature of the asbestos. Wetting with the solutions also facilitates the removal of asbestos-containing material from the substrate on which it is installed.

27 Claims, No Drawings

METHOD AND PRODUCTS FOR TREATING ASBESTOS

This application is a continuation-in-part of application Ser. No. 07/509,571, filed Apr. 13, 1990, and Ser. No. 07/862,433, filed Apr. 2, 1992, now allowed.

BACKGROUND OF THE INVENTION

The invention relates to a method for treating asbestos so as to render it harmless, and to a solution effective for use in such treatment.

Asbestos is a commercial term applied to a group of silicate minerals which occur in fibrous form. There are six principal asbestos minerals. Of these six minerals, only one, chrysotile asbestos, belongs to the group classified as serpentine asbestos, that is, minerals characterized by long fibers that are serpentine in shape. The chemical composition of chrysotile asbestos may be represented as: $Mg_3(Si_2O_5)(OH)_4$ or $3MgO.2SiO_2.H_2O$. The crystalline structure of chrysotile asbestos consists of alternating layers of silica and magnesium oxide/hydroxide bound to each other through covalently shared oxygen. These layers are transverse to the fiber axis.

The other varieties of asbestos are silicates of magnesium, iron, calcium, and sodium. These varieties of asbestos belong to the amphibole (straight fiber) group of minerals. About 95% of world production is the chrysotile form of asbestos.

Due to the unique properties of the asbestos minerals, many different kinds of products were developed during the 1940's through the early 1970's that incorporated asbestos fibers for fire resistance, moisture control, and thermal insulation. Many building products, for example, friable thermal insulation, asbestos-cement pipe, asbestos-cement sheet, floor and roof shingles, transite tiles, acoustical plaster, insulation and fire-retardant paper products, and high-temperature insulation, include asbestos fibers. In the overwhelming majority of cases, these products contain the chrysotile form of asbestos.

For a number of years now it has been recognized that many chronic diseases are associated with the inhalation of airborne asbestos fibers. These diseases include lung cancer, chronic fibrosis of the lung lining, and mesothelioma (a rare but fatal cancer of the lungs). Although not completely understood, it is believed that when an asbestos fiber comes into contact with a living cell, the asbestos fiber irritates the cell lining and leads to its eventual weakening. After such weakening, it is believed the asbestos fiber enters the cell. Once inside the living cell, the asbestos fiber appears to set in motion a collagen synthesis ultimately resulting in chronic fibrosis and a potential for developing carcinoma.

Due to its hazardous nature, there has been a concerted effort by governmental agencies to ban the use and encourage the removal of materials containing asbestos fibers. The U.S. Environmental Protection Agency has set an upper limit of 1% for the allowable asbestos fiber content in building materials. Furthermore, local governmental agencies in many cities, for example, New York City, require the removal of asbestos materials from buildings before they will issue permits for building renovation or demolition. Many safeguards must be employed to prevent inhalation of airborne asbestos fibers by workers and others in the vicinity of the work area. Respirators must be worn by workers handling the asbestos. Any area in a building in which asbestos material is exposed or is being removed must be isolated by partitions from the remainder of the building. Also, the work area must be kept at a negative pressure with respect to the atmosphere to prevent airborne fibers from leaving the area. Needless to say, these measures are both cumbersome and costly. Additionally, disposal of asbestos products removed from the building also remains a problem.

A number of methods have been proposed for rendering asbestos less harmful but without substantially affecting its significant physical and chemical properties. In U.S. Pat. No. 4,401,636 (Flowers) a method is described for treating silicate minerals with an aqueous metal salt solution to form a metal-micelle silicate. The method purport to render the resulting silicate less harmful to living cells while the treated silicate retains most of its asbestos-like properties. However, the method proposed therein is not totally satisfactory since it does not destroy the fibrous nature of the asbestos. According to the method described in U.S. Pat. No. 4,401,636, a metal is added to the crystal structure of the asbestos, thereby forming a metal-micelle which masks the iron-binding sites in the asbestos. According to that patent, the metal-micelle asbestos, when introduced into a living cell, does not react with cellular iron. Therefore, it is asserted, the reaction that is believed to initiate fibrosis should be blocked and biological hazards associated with exposure of living organisms to asbestos should be reduced.

Accordingly, it is an object of the present invention to provide a process for rendering asbestos harmless by destroying its crystalline structure and fibrous nature.

It is another object of the present invention to provide an in situ process for rendering harmless asbestos-containing building materials which are already in use, thereby obviating the need to remove these materials from buildings.

It is yet another object of the present invention to provide such a process which is simple and much less expensive than present methods of removing asbestos-containing building materials from buildings.

SUMMARY OF THE INVENTION

In accordance with the present invention, a simple method for treating asbestos to render it harmless is provided. The method comprises applying a dilute aqueous weak acid solution to asbestos-containing materials. For chrysotile asbestos the acid solution hydrolyses the magnesium oxide (MgO) units in the crystal structure, thereby destroying the crystal structure and the fibrous nature of the chrysotile asbestos. The aqueous solution should have an acid concentration of about 1–25% by weight, preferably about 5–15% by weight.

The term "weak acid" is used herein in its generally understood sense, i.e., an acid is defined as being "weak" if its protolysis reaction with water does not go essentially to completion unless the solution is extremely dilute.

In accordance with one embodiment of the invention, the method may be used in situ by spraying asbestos-containing materials which are in place, for instance, in a building, with the weak acid solution. Depending on what acid is used, one is able to achieve 90% and preferably greater conversion of the asbestos such that what remains is a non-asbestos material which, however, retains fire retardant properties. When 90% or more of asbestos is converted in accordance with the method of the present invention, the remaining material no longer has the characteristic asbestos fibrous nature and so is essentially no longer asbestos.

When the method of the invention is performed in situ, the asbestos-containing materials preferably receive more than one, e.g., two to six or more, spray applications of an aqueous solution of a weak organic acid, such as trifluoroacetic acid, to achieve a 98% or more conversion of the asbestos. Advantageously, in accordance with this embodiment of the invention, depending on the initial condition of the asbestos-containing material, the types of binders and other materials combined with the asbestos and its adherence to the underlying substrate, the converted material can be left in place and still retain good insulating and fire retardant properties. In such case, a stabilizing agent, which may preferably comprise a resin in combination with a sodium silicate material, is applied to the converted material. The stabilizing agent binds the converted material together and to the substrate and prevents them from becoming airborne.

In accordance with another preferred embodiment of the invention, the asbestos-containing materials are sprayed in situ with an aqueous solution containing a weak acid and a source of fluoride ions, such as ammonium fluoride ($NH_4F$), ammonium bifluoride ($NH_4F_2$) or sodium fluoride (NaF). Desirably, the aqueous solution should comprise about 1-25%, preferably about 5-15%, by weight of an organic acid, and about 1-10%, preferably about 2-8%, by weight of the fluoride ion source. The concentration of the acid in the solution should be higher than that of the fluoride ion source such that their molar equivalent ratio is maintained at greater than one during use. A solution containing both a dilute weak acid and a source of fluoride ions attacks asbestos in two ways. As mentioned above, the acid attacks the MgO layers in the crystal structure of chrysotile asbestos. Simultaneously, the fluoride ions attack the silica layers, converting them into fluorosilicate. Adding fluoride ions to the treatment solution greatly speeds up the rate of conversion of asbestos. It is believed that the fluoride ion increases the rate at which the weak acid diffuses into the magnesia layers. It also makes the solution much more effective in converting forms of asbestos other than chrysotile, such as amosite, which are not attacked very strongly by the weak acid solution alone.

In accordance with a further embodiment of the invention, the treatment of the asbestos-containing material may be performed by immersing asbestos-containing material which has been removed from a substrate, such as, for example, building structural members or pipes, in a solution of the kind described above, preferably with heating and agitation of the solution. Most preferably the asbestos-containing material is first wet in situ with the solution one or more times, for instance, by spraying, and then removed while still wet and soaked in the solution, e.g., by immersion, preferably with agitation and, optionally, heating, until the conversion is complete. Thereafter, the residue may be neutralized and disposed of as a non-hazardous material. Preferably, the asbestos-containing material should be permitted to dry between successive in situ wettings by the treatment solutions.

In accordance with a still further aspect of the invention in cases where the asbestos-containing material is a solid which cannot easily be penetrated with the solution by spraying or immersion, the material can be ground, preferably while immersed in the solution, to expose the asbestos to the solution.

The solutions of the invention most useful for converting asbestos to a non-crystalline material comprise aqueous solutions of between about 1-25%, preferably about 5-15%, by weight of a weak organic acid and about 1-10%, preferably about 2-8% by weight of a fluoride ion source.

DETAILED DESCRIPTION OF PREFERRED EMBODIMENTS

The present invention is intended for the treatment of asbestos containing materials containing chrysotile or other forms of asbestos, such as amosite.

In accordance with the present invention, asbestos-containing material is treated, for example by spraying or immersion, with a dilute aqueous solution of a weak acid having a concentration of about 1 to 25%, and preferably 5 to 15%, by weight of the weak acid. Preferably, the solution also contains about 1 to 10%, most preferably about 2 to 8%, by weight of a source of fluoride ions. Higher concentrations of weak acid and fluoride ion source may be used but increase expense and materials handling problems, without having been found to provide significant increased benefits. The concentrations of the fluoride ion source is further limited by its solubility. Preferably, the weak acid is a weak organic acid having a pH in the range of about 2 to 6. Among the weak organic acids which have been used successfully in accordance with this invention are acetic acid, p-cyanobenzoic acid, trifluoroacetic acid, lactic acid, benzoic acid, and formic acid. Of these, trifluoroacetic, lactic, formic and acetic acids are preferred, with trifluoroacetic acid being most preferred. Acetic acid is substantially slower acting than the others, so that it is less preferred. Weak acids having lower pH's are normally preferred over ones having higher pH's. In principle, any water soluble weak acid may be used, particularly any organic weak acid. The reaction rates and other characteristics of particular acids may make them undesirable, however. Dilute solutions of organic weak acids are preferred because, in accordance with the invention, they have been found to wet the asbestos-containing materials extremely well, and obviate the need for any separate wetting agent.

The above weak acids have the following $pK_a$'s:

| Acid | $pK_a$ |
| --- | --- |
| Acetic | 4.76 |
| Benzoic | 4.21 |
| Lactic | 3.86 |
| Formic | 3.75 |
| p-cyanobenzoic | 3.55 |
| Trifluoroacetic | 0.25 |

Suitable fluoride ion sources include, for example, ammonium fluoride salts such as ammonium fluoride, ammonium bifluoride, metal fluoride salts such as alkali metal fluorides, stannous or stannic fluoride or other soluble metal fluoride salts, and mixtures of the above. In limited circumstances, hydrofluoric acid may also be used but is generally not preferred because of its toxicity. The fluoride ion, especially in weak acid solution, is believed to attack the silica layers and greatly enhances the rate at which the weak acid attacks the MgO units in chrysotile asbestos. An important advantage of the preferred treatment solutions of the invention is that they can be handled with only reasonable precautions.

All forms of asbestos are crystalline minerals. The conversion process of the invention converts the asbestos to a noncrystalline material, such as a glass, or at least to a material which no longer has more than trace amounts of asbestos crystallinity when measured by currently accepted methods, such as polarizing light microscopy, TEM or X-ray diffraction. Preferably, all traces of asbestos crystallinity are destroyed by the process of the invention. When reductions in crystallinity are referred to herein, it is referring to the reduction or substantial elimination of asbestos crystallinity. Similarly, when the process of the invention is referred to as converting the asbestos-containing material to a non-fibrous material, it refers to the elimination of asbestos fibers. Other types of fibers, such as fine glass fibers, may remain, particularly if the process is performed completely in situ.

The crystalline structure of chrysotile asbestos consists of a polymeric silica backbone interspersed with MgO units. When chrysotile asbestos is wet or immersed by or in a dilute solution containing a weak acid in accordance with the invention, it is believed that the MgO units are hydrolyzed to $Mg(OH)_2$, which is leached out of the structure by the solution while leaving the silica backbone intact. This destroys the original crystalline structure of the chrysotile asbestos. Depending on the type of treatment, the resulting material may comprise fine glass fibers, a particulate or a combination of both. A substantial portion of the asbestos dissolves completely and is believed to form compounds such as fluorosilicic acid. The resulting materials retains good fire-retardant and thermal insulation properties.

Depending on the weak acid that is chosen and its concentration, it is possible to achieve more than 90% reduction of the crystallinity of asbestos by means of the present invention. All that is necessary is to wet the chrysotile fibers with the weak acid solution, for instance, either by spraying the asbestos material with the solution or immersing the material in the solution. In the case of asbestos-containing building materials such as fireproofing materials on girders and decking, this can be done in situ by spraying the weak acid solution directly onto the asbestos-containing materials. In the case of such asbestos-containing building materials it is usually necessary to open up the building structures in order to expose the fibers. So long as the weak acid solution can penetrate into the asbestos-containing materials so as to wet the fibers, a significant reduction in crystallinity can be achieved and with repeated applications the asbestos is converted to a non-fibrous, non-hazardous material. In order to improve the wetting process, it is desirable in some cases to add a wetting agent to the weak acid solution being sprayed on the asbestos-containing material. For example, an anionic surfactant, such as sodium dodecyl sulfate or a nonionic surfactant such as Surfynol 465, a product sold by the Air Products Company, can be added to the weak acid solution in conventional amounts (e.g., in amounts of about 1% by weight) to increase wetting of the asbestos fibers. Excellent wetting has been achieved in most instances, however, with the application of a weak organic acid solution alone, without an additional wetting agent.

If the asbestos-containing material is to be removed from the building component or other substrate to which it is applied, or if loose asbestos-containing material is to be treated in accordance with the invention, it is frequently preferable to immerse the asbestos-containing material in the weak acid solution to insure complete wetting. In such case, the solution is preferably agitated, for instance with the use of a propeller-type mixer such as is commonly used in industrial settings, which significantly speeds the conversion of the asbestos. The conversion can be further speeded, if desired, by heating the solution. Heating the solution usually has less effect on the conversion rate in spraying operations because the mass and thermal inertia of the material being treated is normally much greater than that of the solution being applied.

Table 1 sets forth a number of weak organic acids that have been used in accordance with the present invention without the presence of fluoride ions to reduce the crystallinity of chrysotile asbestos. Table 1 also sets forth the degree of reduction in crystallinity of chrysotile fibers which were immersed in the aqueous solution as measured by X-ray diffraction.

TABLE 1

| of Acid | Concentration (in wt. %) | Reduction |
|---|---|---|
| Crystallinity | | |
| p-Trifluoromethyl benzoic acid | 0.6% | <10% |
| Acetic acid | 5% | 30—90% |
| p-Cyanobenzoic acid | 1% | 90% |
| Trifluoroacetic acid | 5% | >98% |
| Lactic acid | 5% | 95% |

The conversions shown in Table 1 take place in periods ranging from 2 days to 4 weeks. In large measure, these long periods of time are required by the slow nature of the reaction, particularly the slow rate at which the weak acids diffuse through the silica layers. Some acids, such as trifluoroacetic acid, react much faster than others and are preferred. In some cases, the slow reaction is due to the difficulty in actually wetting the asbestos fibers contained therein. For example, it is much easier to wet the exposed asbestos fibers in pipe insulation than it is to wet asbestos fibers which are tightly bound to a binder such as, for example, transite board or floor tile.

In order to ensure that as much conversion as possible takes place in in situ conversion treatments, the asbestos fibers are preferably subjected to successive sprayings with the weak acid solution. Thus, after wetting the asbestos-containing materials a first time with the solution and allowing the hydrolysis reaction to proceed, for instance, for 24 hours, the materials can be wet a second and successive times, preferably with about 12 to 24 hours between each application, until the destruction of the asbestos fibers is achieved. The number of wettings or sprayings required for complete destruction of the asbestos fiber depends on a variety of factors, such as the amount and porosity of the binder with which the asbestos fibers are mixed, the particular weak acid employed, whether a fluoride ion source is included in the solution, and the type of asbestos fibers being treated. It has been found, in accordance with the invention, that the effectiveness of the individual sprayings is substantially increased if the material being treated is permitted to dry between each successive spray application. It is believed that the reason for this is that degradation products produced by the reaction become hydrated and impede transport of fresh treatment solution to the asbestos fibers during subsequent applications. Drying the asbestos-containing material between applications obviates this problem.

If the asbestos-containing material is converted in situ in accordance with the invention, the resulting non-fibrous material may be left in place to perform the fireproofing or other function for which the asbestos was originally installed provided it has retained its physical integrity and adheres adequately to the underlying substrate. In such event, the resulting material is preferably sprayed or washed with a mild alkaline solution, such as of sodium bicarbonate, in order to neutralize any remaining acid in the material. The material is fully neutralized when the pH of a sample placed in water is at 7.

After being neutralized, the material may be stabilized by applying a stabilizing or fixing agent to the material to bind it together. The stabilizing agent should contain a resin-like material, such as a latex resin, as a binder. Desirably, the stabilizing agent also contains a sodium silicate material which helps to bind and harden the material. The stabilizing agent may also include an alkaline neutralizing material, in which case the neutralizing and stabilizing steps may be combined, so that the need for a separate neutralizing step is obviated.

One suitable stabilizing agent comprises about 25% by volume N-sodium silicate, 25% by volume acrylic latex (Rohm and Haas), 5% by volume latex (B. F. Goodrich), 10% by volume alkaline cleaner (Du Bois), 5% by volume water softener (Calgon), 5% by volume wetting and dispersing additive (Byk), and 25% by volume water. Other stabilizing agents may include styrene-butadiene or polyvinyl chloride resins. Such resins may be used with or without sodium silicate. Yet another stabilizing agent includes a urethane resin and no sodium silicate.

The stabilizing agent is applied preferably by spraying, after the asbestos-containing material has been treated sufficiently to effectively destroy the fibrous asbestos. Preferably it should be applied while the material is somewhat damp, in two coats applied at a 90° angle with one another. The stabilizing agent typically requires about 4 to 8 hours to cure, depending on the atmospheric humidity. If necessary, for additional fire-retardant characteristics, a layer of non-asbestos-containing fireproofing material can be sprayed over the stabilized material.

As pointed out above, the use of the weak acid alone in the treatment solution has drawbacks. The rate of conversion of the asbestos by the weak acid is slow and the solution is effective only for the treatment of chrysotile asbestos. While applicants do not wish or intend to be bound by any particular theory or the manner in which the reactions in the method of the invention proceed, it is believed that the MgO layers of chrysotile asbestos attacked by the weak acid are interleaved with silica layers and that the rate of conversion depends, to a great extent, on the rate at which the weak acid diffuses through the silica layers. Applicants have found, in accordance with a preferred embodiment of the invention, the addition of a source of fluoride ions to the treatment solution both dramatically speeds the rate of conversion of the asbestos to a non-fibrous material and makes the process of the invention effective for the conversion of other types of asbestos, such as amosite, to a non-fibrous material. In the case of amosite, it is believed that the treatment solution of the invention converts the asbestos to a noncrystalline product by the fluoride ions attacking the silica content of the asbestos. To do this it is necessary that the fluoride ions be in an acid environment.

Suitable fluoride ion sources include, for example, ammonium fluoride salts, such as ammonium fluoride ($NH_4F$), ammonium bifluoride ($NH_4F_2$), metal fluoride salts, such as alkali metal fluorides (LiF, NaF, KF, CsF), and mixtures of the above. The fluoride ion, especially in weak acid solution, is believed to attack the silica layers and greatly enhances the rate at which the weak acid attacks the MgO units in chrysotile asbestos. A hydrofluoric acid (HF) solution of may be used alone both as the acid and the fluoride ion source but great care must be exercised in handling it because of its extreme toxicity, and it is not appropriate in most circumstances. An important advantage of the preferred treatment solutions of the invention is that they can be handled with only reasonable precautions.

For example, in laboratory tests, it has been found that samples of chrysotile asbestos which are not completely converted in 24 hours when immersed in a 10% trifluoroacetic acid solution due to the slow nature of the reaction, are completely dissolved in only 2 hours in an aqueous solution containing 10% trifluoroacetic acid and 5% ammonium fluoride.

It has further been found that the rate of reaction is also significantly increased if the asbestos material immersed in the treating solution is stirred or agitated, preferably with a high shear mixer, while the treatment continues. Heating the treatment solution to a temperature of, e.g., about 50°–85°C., further increases the rate of reaction.

In accordance with another and often preferred embodiment of the invention, the asbestos-containing material is removed from the substrate to which it has been applied, preferably while still wet from one or more initial spray applications of the treatment solution of the invention, and digested by immersion in the solution, preferably with agitation with a high shear mixing blade, until the asbestos is destroyed.

It has been found that about 2 parts to 10 parts by weight of the treatment solution per part of asbestos should be used for the digestion step, with about 5 parts by weight of the acid solution to part of asbestos material normally being adequate to effect conversion in a reasonable amount of time. It has been found that the use of higher ratios of treatment solution to asbestos-containing material results in faster conversion of the asbestos to a nonhazardous material, the conversion typically being completed in ½ to 1 hour when ratios of ¾ to 1 pound of asbestos-containing material to one gallon (about 8.7 pounds) of treatment solution.

The process of the invention, as applied to the abatement of asbestos in buildings, may typically include the steps of removing any obstructions, such as interior partitions, ceilings and column covers to expose the suspected asbestos-containing materials, sampling and testing the suspected asbestos-containing materials in accordance with applicable standards to determine its composition and other relevant characteristics, determining an optimum formulation for a treatment solution depending on such composition and characteristics, including the need for a separate wetting agent and suitable types and concentrations of weak acids and fluoride ion sources, providing a sufficient amount of such treatment solution, repeatedly spraying the asbestos-containing material in situ with such solution, or removing the asbestos-containing material from the substrate to which it is applied, preferably while it is still wet from an initial spray application of the solution, and immersing the removed material in a container of such treatment solution, in either case until the fibrous nature of the asbestos is effectively destroyed. Thereafter the surfaces that were coated with such asbestos-containing material are refireproofed by either neutralizing and stabilizing the converted material in situ, or by applying a non-asbestos-containing fireproofing material on such surfaces from which the asbestos has been removed. In the latter case a final light spray application or misting of the treatment solution to the surfaces is desirable to convert any remaining asbestos fibers which have been missed by the removal process. For the reasons indicated above it is preferred that the surface be dry before the misting. The surfaces are also preferably neutralized by spraying with mild alkaline solutions. Optionally, an additional layer of fireproofing material can be applied over the stabilized material. The asbestos abatement process may also be carried out by spraying the asbestos-containing material one or more times with the treatment solution, removing the asbestos-containing material while still wet and disposing of it in a conventional manner. The underlying substrate can then be misted with the treatment solution (after drying, if desired), neutralized, and then refireproofed as described above. The particular composition of the solution used for the various spray applications, or for an initial spray application and immersion, may be varied if desired, but are referred to herein collectively as a singular solution. For instance, the concentration of the solution used for the digestion step might preferably be higher than that used for the spray application steps for safety reasons.

The asbestos abatement process may also be carried out by spraying the asbestos-containing material one or more times with the treatment solution, removing the asbestos-containing material while still wet and disposing of it in a conventional manner. It has been found that the solutions of the invention speeds the process of removing the asbestos-containing material from building substrates by as much as 30% to 40% over the time required with other known methods, such as wetting the asbestos containing material with a soap solution. This is an important advantage of the solutions of the present invention and results directly in a substantial reduction in labor cost and building down-time, both in cases where the asbestos-containing material is to be digested in accordance with that aspect of the invention, and where the material is to be disposed of conventionally.

The solutions used for digesting the asbestos in the asbestos containing material by immersion may be re-used a plurality of times, depending upon the amount of asbestos digested. Advantageously, it may also be reconstituted a number of times by adding to it after one of more uses a measured amount of an acid and/or fluoride ion source concentrate in order to restore the concentration of those constituents of the solution to the proper ranges. The amount of acid and fluoride ion source to be added can be determined by measuring the pH and the fluoride ion content of the solution. The solids residue of the converted material is preferably removed from the solution after each digestion operation, for instance, either by decanting and straining the liquid into another container for reuse, or by removing the solids from the container.

If, as contemplated, the digestion step is carried out using containers of a standard size (e.g. a 55 gallon drum), the recharge concentrate may be supplied in a standard size container, such as a sealed plastic pouch, containing an appropriate amount of the concentrate. This permits the recharging of the digestion solution to be accomplished safely at the job site by relatively unskilled workers with minimum chance of contact with the concentrate. The sealed pouch containing the concentrate may be immersed in the digestion solution and punctured, so that the concentrate is mixed with the dilute digestion solution. The empty pouch may then be removed from the container and disposed of.

For ease of handling and measurement, it is preferred to use solid forms of fluoride ion source and acid as the concentrate. Ammonium bifluoride and formic acid are both available in crystalline form and are preferred components of the digestion solution from the point of view of both cost and effectiveness. Such solid concentrate can advantageously be supplied in a double pouch; a starch based plastic water soluble inner pouch and an insoluble plastic outer pouch of, for example, polyethylene. In such case, the inner pouch could be immersed in the container and allowed to dissolve. Alternatively, the concentrate could be supplied in another type of unbreakable container, such as a plastic jar or bag and poured into the container. Preferably the acid and fluoride ion source are shipped and added separately.

After the asbestos-containing material is removed, the underlying substrate can be misted with the treatment solution (after drying, if desired), neutralized, and then refireproofed as described above. The particular composition of the solution used for the various spray applications, or for an initial spray application and immersion, may be varied if desired, but are referred to herein collectively as a singular solution. For instance, the concentration of the solution used for the digestion step might preferably be higher than that used for the spray application steps for safety reasons.

During the removal of asbestos-containing materials, it frequently occurs that substantial amounts of asbestos-containing dust is generated which coats building surfaces such as floors and walls. All traces of this dust must be carefully collected and removed. This is an expensive and time-consuming project because the dust is itself hazardous and must be handled with extreme care. In accordance with the invention, this dust may be dealt with easily and much less expensively by spraying it in situ with a solution of the invention, repeatedly if necessary, in order to convert any asbestos in the dust to a non-fibrous, non-hazardous material. Thereafter the dust may be collected and removed by inexpensive, conventional means, since it no longer contains asbestos.

The initial generation of the dust during the removal of asbestos-containing material from the underlying substrate is preferably minimized in accordance with the invention by wetting the material with the treatment solution of the invention before removal and by keeping such material wet with such solution while it is removed from the substrate.

In cases where the asbestos-containing materials are collected and digested by immersion in a vat containing the treatment solution preferably with stirring or agitation, it is also often desirable to grind up the asbestos-containing material either before or during immersion. This is particularly in the case when the asbestos-containing material is non-porous and not attacked by the treatment solution. Typical examples of such materials are transite board or pipe and asbestos-containing tiles.

In such situations it is necessary to grind up the material to enable the treatment solution to contact the asbestos fibers. In accordance with the invention, this grinding is preferably performed while the material is immersed in or being wet down by the treatment solution in order to prevent the generation of asbestos-containing dust. Often, in such situations, a substantial portion of the material dissolves in the treatment solution, thus reducing the volume of material to be disposed of in a landfill site.

In view of the fact that conditions are more controlled during the digestion step than during spraying in situ it is possible, but generally not preferred, in accordance with the invention to use a dilute solution of a strong mineral acid rather than an organic acid for digesting the asbestos-containing material after it has been sprayed in situ with the weak acid solution and removed from the substrate. Examples of suitable acids include hydrochloric, hydrofluoric, sulfuric and nitric acids. In all cases except hydrofluoric acid it is preferred to include a fluoride ion source in the solution for the purposes described above. The strong acids have the advantage of possibly being somewhat faster acting, but have the severe disadvantage of being much more corrosive and requiring more careful handling and having a higher potential for causing serious injury or damage if they are mishandled, even slightly.

After the asbestos in the material has been digested, it is necessary to dispose of the resulting solid and liquid matter in an environmentally safe manner. It is preferred that the solution be neutralized and the fluoride ions be tied up in compounds having low solubility in water. One way of dealing with the fluoride ions is to merely add sand to the used solution to exhaust the fluoride ions and for fluorosilicates upon neutralization having low solubility in water. Neutralization can be accomplished by adding any alkaline species to the used solution. For instance, sodium hydroxide, sodium bicarbonate or calcium hydroxide could be used, with calcium hydroxide having the advantage that it will tend to form calcium fluoride with any remaining fluoride ions, that is very insoluble in water.

In some situations it may be desirable for the treatment solution to contain about 20 to 50% by weight of ethanol in order to increase the rate of evaporation. It should be kept in mind, however, that a treatment solution containing fluoride ion should not be allowed to come into contact with any glass surfaces which would be etched by the fluoride ions.

The invention will now be described by reference to the following examples:

EXAMPLE 1

A 5% by weight aqueous solution of trifluoroacetic acid was applied to various different kinds of chrysotile-containing building materials. Different asbestos-containing materials required different reaction times depending on factors such as binder, asbestos fiber length, asbestos fiber content and other fibers present. When thermal insulation, such as used for insulating pipe runs and boilers, was washed a first time with the acid solution, allowed to penetrate for 24 hours, and then washed a second time with the solution, a reduction in crystallinity of 98% or greater was achieved in periods ranging from 2 to 4 days.

EXAMPLE 2

Thermal insulation was washed five times with a 5% solution of acetic acid with a three to four day wait between successive applications. The material did not dry completely between applications. The treatment resulted in a 90% reduction in crystallinity of the chrysotile asbestos. However, the time required for such conversion was approximately 3 to 4 weeks.

EXAMPLE 3

A 5% solution of lactic acid was used to wash chrysotile asbestos-containing thermal insulation. Six successive washings spaced from one another by approximately 24 hours resulted in a 95% reduction of the chrysotile crystalline structure.

EXAMPLE 4

44 milligrams of chrysotile asbestos were immersed in 550 ml of a 1% aqueous solution of p-cyanobenzoic acid and heated to reflux for 15 hours. Thereafter the material was filtered through a Nuclepore 0.2 micron filter while still hot and the filter cake dried. Examination by differential X-ray analysis showed approximately 90% reduction in the crystallinity of the chrysotile asbestos.

EXAMPLE 5

Chrysotile asbestos was removed from an asbestos rock with tweezers, resulting in fiber bundles of various sizes ranging in size up to a few mils in diameter. 0.5 grams of the asbestos fiber bundles was soaked in a solution of 2.5 g of trifluoroacetic acid in 47.5 g water for about 48 hours without agitation. A small sample was collected and examined by X-ray analysis and showed a reduction of about 75% in crystallinity. Further examination of the remaining soaking material over the following 2 weeks showed little further reduction.

EXAMPLE 6

A 0.595 g sample of fairly short fiber chrysotile asbestos in mineral wool (ca. 50% asbestos) was stirred in a beaker on a magnetic stirring hotplate with 118 ml of a solution consisting of five volume percent trifluoroacetic acid in water. Heat was applied, and the slurry allowed to stir at 55°–60° C. for 2.5 hours. The reaction had proceeded to only a small degree (as judged by visual inspection), so an additional 4.0 ml of concentrated trifluoroacetic acid was added. Heating was continued for an additional 11 hours. The remaining solid was collected by filtering over a Nuclepore 0.2 micron polyester filter. Qualitative examination with a transmission electron microscope (TEM) showed the sample in various stages of degradation, but many of the fibers (ca. 30–40%) still exhibited selected area electron diffraction (SAED) patterns characteristic of chrysotile asbestos.

EXAMPLE 7

1.437 g of the chrysotile/mineral wool sample of Example 6 was stirred magnetically in 90 ml of an aqueous solution of ten volume percent trifluoroacetic acid and five weight percent ammonium fluoride. The temperature was raised to 55–60° C. and maintained. After one hour, most of the material had visibly dissolved. A portion was removed and the insoluble matter collected on a 0.2 micron filter. TEM analysis of this residue revealed very few remaining fibers (estimated at less than one percent), most of the material being in the form of particulate matter.

EXAMPLE 8

0.365 g of the chrysotile/mineral wool sample was magnetically stirred in 20ml of the solution used in Example 7; no heat was applied. The bulk of the material had obviously dissolved after one hour, but the reaction was continued for three hours. A small amount of solid residue was collected on a 0.2 micron filter; TEM analysis showed no fibers remaining.

EXAMPLE 9

0.265 g of the chrysotile/mineral wool sample was magnetically stirred in an aqueous solution of ten volume percent formic acid (a weaker acid than trifluoroacetic) and five weight percent ammonium fluoride. Stirring at room temperature was continued for three hours, at which time undissolved material was collected on a 0.2 micron filter. TEM analysis of the residue showed a low percentage of fibers which appeared under TEM examination not to be asbestos remaining (estimated at ca. 1-2%).

EXAMPLE 10

0.470 g of the chrysotile/mineral wool sample was stirred at room temperature for ten hours in 30ml of an aqueous solution of ten volume percent acetic acid (a weaker acid than formic acid) and five weight percent ammonium fluoride. TEM analysis of the collected residue showed very low fiber content which appeared under TEM not to be asbestos, as in Examples 7-9.

EXAMPLE 11

0.370 g of the chrysotile/mineral wool sample was stirred at room temperature in 20ml of an aqueous solution of ten volume percent trifluoroacetic acid and five weight percent sodium fluoride for three hours. TEM analysis of the small amount of collected residue showed only a trace level of fibrous material which appeared not to be asbestos.

EXAMPLE 12

A 0.253 g sample of 7 to 8% chrysotile in a matrix consisting of gypsum and other unidentified components was stirred at room temperature in 15 ml of the solution used in Example 7 for 16 hours, at which time dissolution of the majority of the material was obvious.

EXAMPLE 13

0.300 g of a sample of pure long fiber amosite asbestos was stirred at room temperature for 15 hours in 20ml of the solution used in Example 7. Most of the material was dissolved; the small amount of remaining insoluble material was not fibrous in nature.

EXAMPLE 14

0.479 g of the chrysotile/mineral wool sample was situated on the raised area of a plastic 4 ounce specimen cup such that any drainage could be removed. The sample was treated dropwise with 3.6 ml of the solution used in Example 7 over a period of three minutes. Approximately 1.5 ml of drainage was removed. The sample was then allowed to dry at ambient temperature. The treatment cycle was then repeated as described a total of ten times, with a minimum of 12 hours between treatments. Since the total amount of residue declined during the treatments, the amount of solution added per cycle was gradually lowered to a final value of 2.0 ml.

After two treatment cycles, the TEM micrographs show that the appearance of the treated fibers differs from untreated fibers, although many of the fibers continued to exhibit chrysotile asbestos SAED patterns. After six treatments, the appearance of the fibers is significantly altered. None of the fibers exhibited SAED patterns. Further treatments continued to lower the total residue remaining, but some fibrous material was still present at ten treatments.

While the invention has been described by reference to specific embodiments, this was for purposes of illustration only and should not construed to limit the spirit or the scope of the invention. Those skilled in the art will recognize that numerous alternative embodiments are within the scope of the invention.

We claim:

1. A method for abating asbestos in asbestos-containing material, comprising
   immersing said asbestos-containing material in a sufficient amount of an aqueous solution of an organic acid having a $pK_a$ of between 4.76 and 0.25 and a separate source of fluoride ions selected from ammonium or metal fluoride salts of mixtures thereof while agitating said solution, said solution having a concentration of at least 1% by weight of each of the acid and the source of fluoride ions, for a time sufficient to convert at least 90% of the asbestos in said material to a non-asbestos substance.

2. The method of claim 1 wherein said solution contains up to 25% of said acid.

3. The method of claim 1 further comprising grinding up said asbestos-containing material before or while it is immersed in said solution.

4. The method of claim 1 wherein said solution contains 5 to 15% by weight of said acid and up to 10% by weight of said source of fluoride ions.

5. The method of claim 1 wherein said organic acid is selected rom a group consisting of acetic acid, trifluoroacetic acid, lactic acid, formic acid, and mixtures and derivatives thereof.

6. The method of claim 1 further comprising heating said solution while said asbestos-containing material is immersed therein.

7. A method for abating asbestos in asbestos-containing material installed on a substrate, comprising
   wetting said material with an aqueous solution containing 1 to 15% by weight of an organic acid having a $pK_a$ of between 4.76 and 0.25 while said material is in place on said substrate;
   removing said material from said substrate while wet with said organic acid solution; and
   immersing said removed material in at least about 5 times the weight of said material of an aqueous treatment solution containing 1 to 25% of an acid and at least 2% of a separate source of fluoride ions for a time sufficient to convert at least 90% of the asbestos in said material into a non-asbestos substance.

8. The method of claim 7 wherein said acid in which said material is immersed has a $pK_a$ of between about 4.76 and 0.25.

9. The method of claim 8 wherein said source of fluoride ions is selected from ammonium or metal fluoride salts or mixtures thereof.

10. The method of claim 9 wherein said acid in which said material is immersed is an organic acid.

11. The method of claim 9 wherein said organic acids are selected from the group consisting of acetic acid, trifluoroacetic acid, lactic aid, formic acid, and mixtures and derivatives thereof.

12. The method of claim 7 wherein said organic acid sprayed on said material comprises trifluoroacetic acid.

13. The method of claim 7 wherein said organic acid solution sprayed on said material further contains about 1 to 10% by weight of a separate source of fluoride ions selected from ammonium or metal fluoride salts or mixtures thereof.

14. The method of claim 7 further comprising spraying any asbestos dust produced during said removal step with a solution comprising 1 to 15% by weight of an acid having a $pK_a$ of between about 4.76 and 0.25 and about 1 to 10% by weight of a separate source of fluoride ions selected from ammonium or metal fluoride salts or mixtures thereof.

15. An asbestos abatement process for removing asbestos-containing material from a substrate on which such material is installed, comprising
wetting said asbestos-containing material while installed on said substrate with an aqueous solution containing about 1 to 15% by weight of a organic acid having a $pk_a$ of between 4.76 and 0.25 and about 1 to 10% by weight of a separate source of fluoride ions selected from ammonium or metal fluoride salts or a mixture thereof, and
removing said asbestos-containing material while wet from the substrate.

16. The method of claim 15 wherein the acid is selected from the group consisting of acetic acid, trifluoroacetic acid, lactic acid, formic acid, and mixtures and derivatives thereof.

17. The method of claim 15 wherein said metal fluoride salts are alkali metal fluorides.

18. The process of claim 15 further comprising neutralizing said substrate after removing said asbestos-containing material.

19. The process of claim 18 further comprising installing a non-asbestos-containing fireproofing material on said substrate after neutralization.

20. The method of claim 15 wherein said aqueous solution contains up to about 15% by weight of said organic acid and up to about 8% by weight of said source of fluoride ions.

21. The method of claim 15 wherein said acid comprises trifluoroacetic acid.

22. The method of claim 21 wherein said aqueous solution contains up to about 15% by weight of said weak acid and up to about 8% by weight of said source of fluoride ions.

23. The process of claim 15 wherein said solution is applied to said asbestos-containing material by spraying.

24. The process of claim 15 further including, after removing said material from said substrate:
immersing said asbestos-containing material in an aqueous treatment solution containing about 1 to 25% by weight of an acid and about 1% or more of a separate source of fluoride ions for a time sufficient to convert at least 90% of the asbestos in said immersed material into a non-asbestos substance.

25. The method of claim 24 comprising agitating said treatment solution while said asbestos-containing material is immersed therein.

26. The method of claim 24 wherein said acid in said treatment solution is an organic acid having a $pk_a$ of between 4.76 and 0.25 and said separate source of fluoride ions in said treatment solution is selected from ammonium or metal fluoride salts and mixtures thereof.

27. A method for treating asbestos in asbestos-containing material, comprising:
immersing asbestos-containing material in at least about 5 times the weight of said material of an aqueous treatment solution containing about 1 to 25% by weight of an acid and at least 1% of a separate source of fluoride ions, and agitating said solution for a time sufficient to convert at least 90% of the asbestos in said immersed material into a non-asbestos substance.

* * * * *